June 17, 1941.  F. C. DIECKMAN  2,245,577
MOTOR
Filed Feb. 13, 1940  3 Sheets-Sheet 1

F. C. Dieckman
INVENTOR.
BY C. A. Knowles
ATTORNEYS.

June 17, 1941.    F. C. DIECKMAN    2,245,577
MOTOR
Filed Feb. 13, 1940    3 Sheets-Sheet 2

F. C. Dieckman
INVENTOR.

BY Knowles
ATTORNEYS.

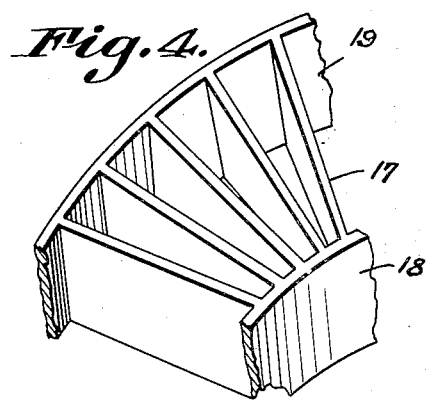
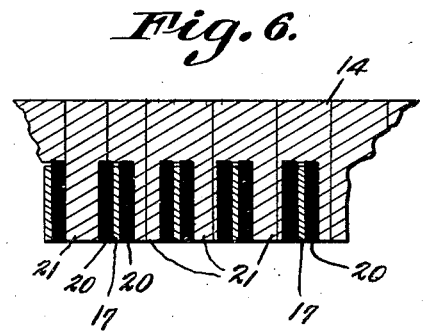
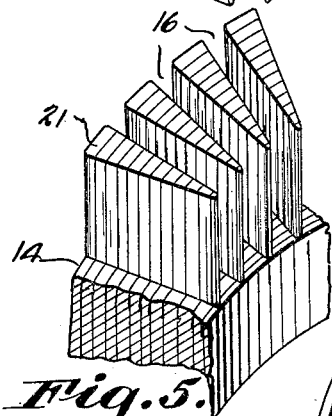
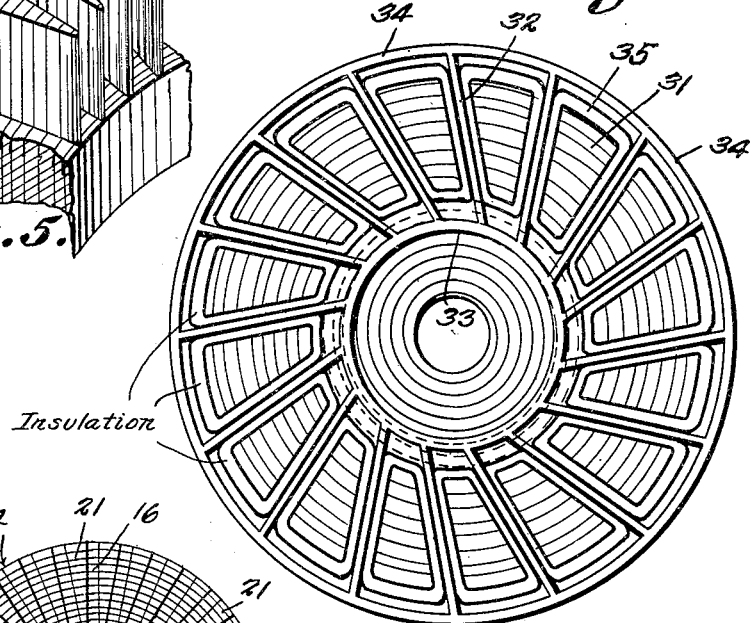
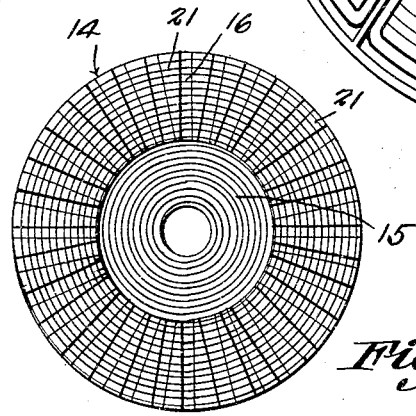

Patented June 17, 1941

2,245,577

UNITED STATES PATENT OFFICE 2,245,577

MOTOR

Frederick C. Dieckman, Rome, Ind.

Application February 13, 1940, Serial No. 318,762

2 Claims. (Cl. 172—120)

This invention relates to an electric motor designed primarily for use in connection with sealed casings such as the casings of refrigerator compressors, etc.

Heretofore considerable difficulty has been experienced in providing leak-proof packings in the bearings of crank shafts where they are extended through the walls of the sealed casings.

An object of the present invention is to provide a motor which does not require extension of the shaft through the casing so that danger of leakage along the shaft is eliminated.

A further object is to provide a motor which can be incorporated in the wall of the sealed casing, this motor being provided with separate rotors one of which serves to drive the shaft of the compressor located in the casing while the other can be utilized for other purposes, such as operating a cooling fan, etc.

A still further object is to provide an induction motor of either a split-phase or polyphase type, the same operating after the manner of the conventional type of squirrel cage motor.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 4 is a perspective view of part of the frame of one of the rotors of the motor.

Figure 5 is a perspective view of a portion of the rotor showing the cores thereon.

Figure 6 is a transverse section through a portion of one of the rotors, said section being taken transversely of the cores and windings.

Figure 7 is a face view of the rotor with the frame removed.

Figure 8 is a face view of a modified form of rotor.

Figure 1:
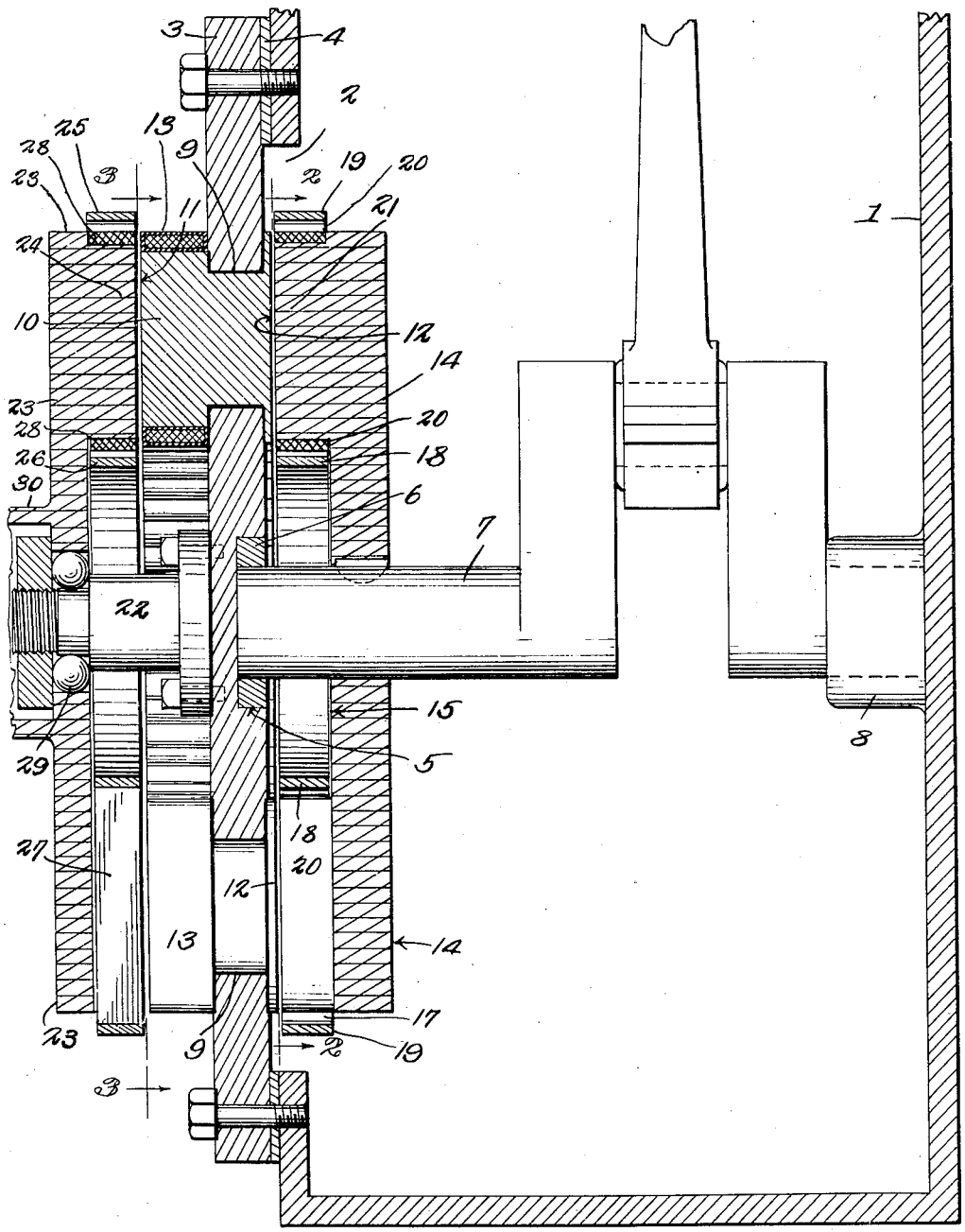
Figure 1 is a vertical section through a portion of the casing of a compressor such as used, for example, in connection with refrigerating apparatus, this casing being equipped with a motor such as constitutes the present invention.

Referring to the figures by characters of reference, 1 designates a portion of a sealed casing and this casing is provided in one wall with an opening 2.

Secured to the casing so as to bridge and close opening 2 is a cover plate 3 and, to prevent leakage, a gasket 4 is preferably interposed between the plate and the wall of the casing. Formed within the inner side of the plate 3 is a recess 5 in which is seated a bearing 6 engaged by one end portion of a crank shaft 7 which is extended transversely within the casing 1 and is mounted at its other end within a bearing 8 located within the casing. This crank shaft can be used for operating the compressor, not shown and which is of the usual type.

Figure 3:
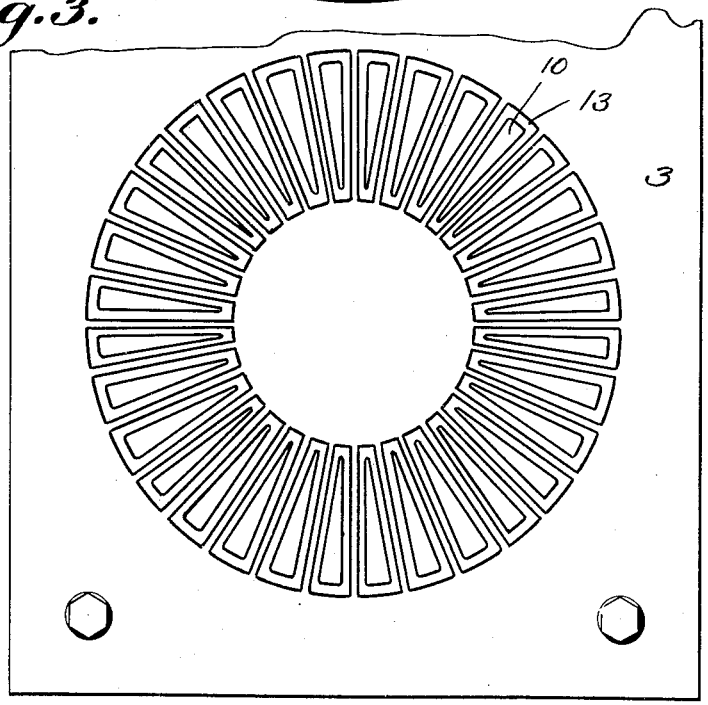
Figure 3 is a section on line 3—3, Figure 1.

Formed within plate 3 are regularly spaced openings 9 arranged in an annular series concentric with the recess 5 and fitted tightly within each of these openings is one of the soft iron cores 10 of the stator of the motor. Gas-tight connections are formed between the cores and the plate and, as shown particularly in Figure 3, the cores are all substantially triangular and radially disposed. Each core has a long end projecting outwardly from the casing 1 and a short end projecting inwardly therefrom, the outer faces of the long ends being flush, as indicated at 11 while the exposed faces of the inner ends are likewise flush, as shown at 12.

The long ends 11 of the cores, which are the outer ends, are provided with the usual windings of a motor, these being indicated at 13.

Secured to shaft 7 so as to rotate therewith is a rotor 14 comprising a spirally wound soft iron strip and in one face of this rotor there is provided a concentric recess 15 into which open radial slots 16 extending to the margin of the rotor and intersecting the laminations of the rotor.

Seated in the slots are radial frame members 17 connected at their inner ends by an inner ring 18 located in recess 15 while the outer ends of the frame members are connected by an outer ring 19. The frame members 17 are spaced from the rotor by insulation indicated at 20 and, as shown particularly in Figures 2, 3 and 8, the cores 21 formed between the slots 16 are substantially triangular and have their exposed faces in a common plane with the exposed faces of the frame members 17 and rings 18 and 19. This plane of the cores and frame members is close to and parallel with the flush faces 12 of the cores 10 and the rotor thus produced and located becomes of the same general type as the motor of the usual squirrel cage type.

In the illustrated structure, when it is designed to take off power from outside the casing or housing 1, a stub shaft 22 is bolted or otherwise fastened to the center of the outer surface of plate 3 where it will align with shaft 7. Mounted for rotation on this stub shaft is a rotor 23 similar to rotor 14 but disposed oppositely thereto. This rotor, like rotor 14, is provided with substantially triangular cores 24 shaped and proportioned like the cores 21 and cooperating with a frame made up of an outer ring 25, an inner ring 26, and connecting frame members 27 all like those indicated at 19, 18 and 17 respectively, it being understood that the inner ring 26 is located within a central concentric recess and that the squirrel cage frame formed by the rings and radial members is spaced from the cores 24 by insulation 28.

The exposed faces of the cores 24 are flush with the exposed faces of the frame made up of members 27, ring 25 and ring 26 and the plane occupied by these faces is close to and parallel with the plane of the adjacent exposed ends of cores 10 of the stator.

Rotor 23 can be provided with an anti-friction bearing 29 and can also be formed with a central extension 30 to be used as a means for transmitting power to a fan or the like.

As before stated the motor formed by the stator and rotors herein described is of the induction type and will be wired in the same manner as such motors. Consequently when this motor is energized, the two rotors will be actuated relative to the stator so that shaft 7 will be driven by rotor 14 while the outer rotor 23 will operate to drive any mechanism to be coupled thereto. All of this can be done without forming any opening in plate 3 for the shaft 7 and without necessitating the employment of a gas-proof seal such as commonly employed.

Figure 2:
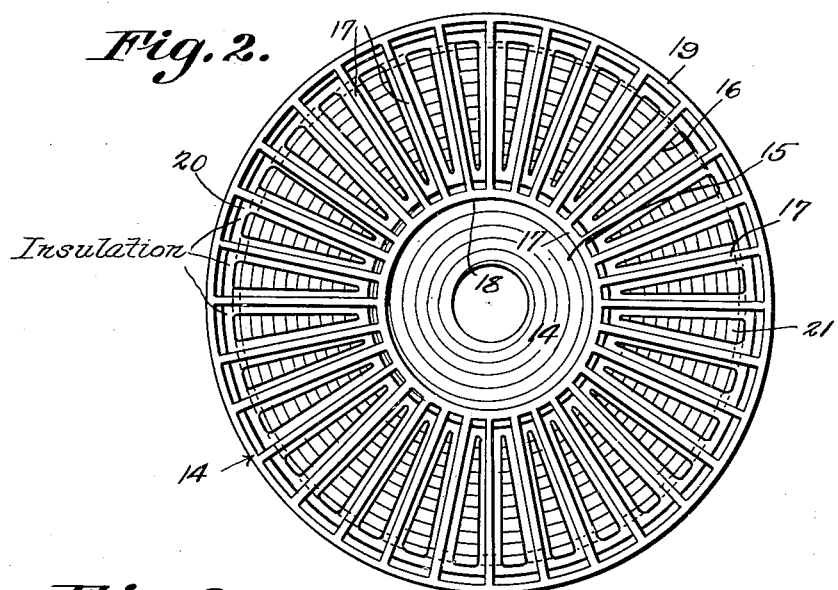
Figure 2 is a section on line 2—2, Figure 1.

Instead of arranging the cores with radial slots between them, as has been illustrated in Figures 2, 5 and 8, the cores can be tangentially disposed as shown at 31 in Figure 8. In other respects this modified construction is the same as already described, the cores being separated by frame members 32 joined at their inner and outer ends by rings 33 and 34 and spaced from the cores by insulation 35.

It is to be understood that the patterns of the rotors can be varied to suit the requirements but in every case the pattern of the stator cores must be the same as the pattern of the rotors at their cooperating faces.

The windings of the stator can be of the usual or any preferred type and obviously the plate 3 carrying the stator can be made of any suitable non-magnetic material.

Although the motor is shown attached to a cylinder type compressor, it may be just as easily attached to a rotor type compressor or pump.

Although a rotor has been shown outside of the casing for driving an outside load, it is to be understood that if there is no outside load to be driven, a plane laminated iron plate could be bolted firmly against the outer faces of the cores of the stator to complete the magnetic path and under these conditions it would be unnecessary to use the stub shaft 22.

What is claimed is:

1. The combination with a structure having an opening, and a driven shaft in the structure, of a motor including a flat, nonmagnetic plate closing the opening and providing a bearing for one end of the shaft, said plate being imperforate at the point of bearing, an annular series of parallel cores extending through and having a gas-tight fit within the plate and having ends exposed within the structure and positioned in a plane perpendicular to the axis of rotation of the shaft, the outer ends of said cores projecting outwardly from the structure, said outer ends being provided with the motor windings, and a rotor at each side of the plate, one rotor being secured to the shaft at one side of the plate, said rotor including a disk, cores extending laterally from the disk and terminating in a plane close to and parallel with the plane occupied by the adjacent ends of the stator cores, and motor windings on the cores of the rotor, and the other rotor being mounted for rotation at the other side of the plate about an axis coaxial with the shaft, said last named rotor including a disk, cores extending laterally therefrom toward the stator and terminating in a plane close to and parallel with the plane occupied by the adjacent ends of the stator cores, and induction motor windings on the cores of said last named rotor.

2. The combination with a structure having an opening, of an induction motor including a flat, one-piece plate constituting a closure for the opening, a circular series of parallel regularly spaced cores carried by and having a gas-tight fit in the plate and having inner ends exposed within the structure in a plane parallel with the plate and having their outer ends projecting outwardly from the plate, there being motor windings on the outer ends of the cores and said outer ends terminating in a plane parallel with the plate, a driven shaft seated in one side of the plate and positioned within the structure, said plate being imperforate at the point of bearing, a rotor secured to the shaft and within the structure, said rotor including a disk, and laterally extending parallel cores carried by the disk and positioned in an annular series concentric with the shaft, the cores on said rotor terminating in a plane close to and parallel with the plane occupied by the adjacent ends of the stator cores, there being induction motor windings on the cores of the rotor, a bearing element extending outwardly from the plate and alined with but spaced from the shaft by the plate, and a rotor outside of the structure and freely rotatable on said bearing element, said rotor including a disk, cores extending laterally therefrom toward the stator cores, and induction motor windings on the cores of said rotor.

FREDERICK C. DIECKMAN.